US008477326B2

(12) United States Patent
Matsunaga et al.

(10) Patent No.: US 8,477,326 B2
(45) Date of Patent: Jul. 2, 2013

(54) IMAGE FORMATION APPARATUS, PRINTING DATA GENERATION APPARATUS, COMPUTER-READABLE RECORDING MEDIUM, AND PRINTING DATA GENERATION METHOD

(75) Inventors: Takahisa Matsunaga, Hino (JP); Fumihito Akiyama, Yokohama (JP); Masahiro Ozawa, Hino (JP); Jun Kuroki, Superior, CO (US); Hiroshi Nogawa, Hachioji (JP); Yasufumi Aoyama, Hino (JP); Kunikazu Satou, Tama (JP); Yasutaka Shimohara, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 247 days.

(21) Appl. No.: 12/978,715

(22) Filed: Dec. 27, 2010

(65) Prior Publication Data

US 2011/0304871 A1    Dec. 15, 2011

(30) Foreign Application Priority Data

Jan. 4, 2010   (JP) ................................ 2010-000014

(51) Int. Cl.
*G06F 3/12*    (2006.01)
(52) U.S. Cl.
USPC ......................................................... 358/1.13

(58) Field of Classification Search
None
See application file for complete search history.

(56) References Cited

U.S. PATENT DOCUMENTS

2004/0243934 A1* 12/2004 Wood et al. .................... 715/517
2008/0211819 A1*  9/2008 Hopp et al. .................... 345/520

FOREIGN PATENT DOCUMENTS

JP         2002-073303 A    3/2002

* cited by examiner

*Primary Examiner* — Marivelisse Santiago Cordero
*Assistant Examiner* — Mesfin Getaneh
(74) *Attorney, Agent, or Firm* — Buchanan Ingersoll & Rooney PC

(57) ABSTRACT

Disclosed is an image formation apparatus, comprising: a reception section to receive PDL data; an image processing section including a plurality of operation sections, each of which executing a task performing processing by a page or a task performing processing by a band to generate printing data based on the PDL data; a control section to analyze the PDL data to obtain the number of printing pages, the control section dynamically setting the number of the operation sections assigned to each of the task performing the processing by the page and the task performing the processing by the band in accordance with the obtained number of the printing pages; and a printing section to form an image on a printing medium based on the generated printing data.

7 Claims, 10 Drawing Sheets

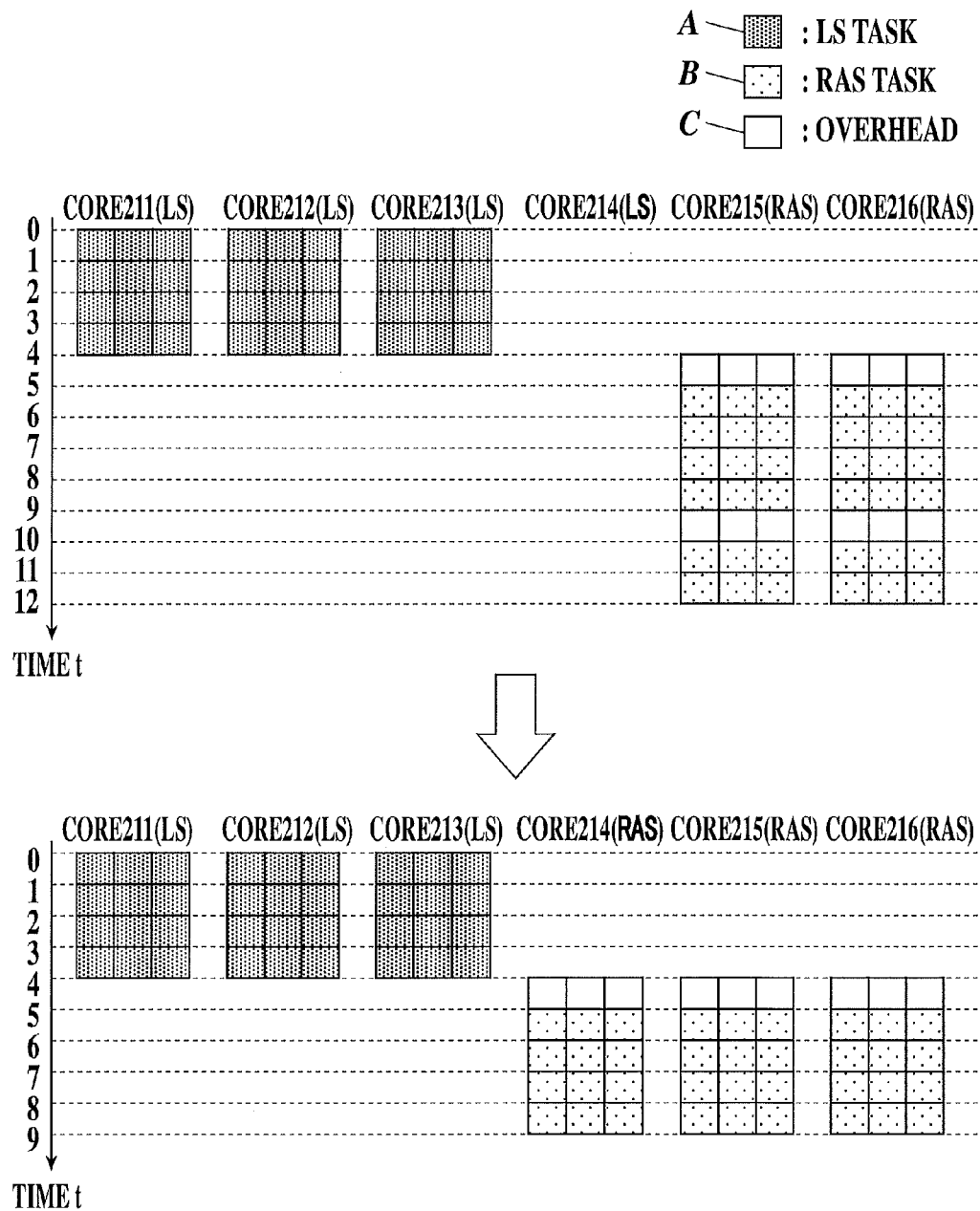

A — ▦ : LS TASK
B — ▢ : RAS TASK
C — □ : OVERHEAD

IMAGE FORMATION APPARATUS, PRINTING DATA GENERATION APPARATUS, COMPUTER-READABLE RECORDING MEDIUM, AND PRINTING DATA GENERATION METHOD

CROSS-REFERENCE TO RELATED APPLICATION

The present U.S. patent application claims a priority under the Paris Convention of Japanese patent application No. 2010-000014 filed on Jan. 4, 2010, which shall be a basis of correction of an incorrect translation.

BACKGROUND OF THE INVENTION

1. Field of the Invention

The present invention relates to an image formation apparatus, a printing data generation apparatus, a computer-readable recording medium, and printing data generation method.

2. Description of the Related Art

In order to improve throughput of printing, technique of performing the generation of bitmap data (printing data) based on page description language (PDL) data, the transfer of the data to a printer, and the like by using a plurality of operation sections have conventionally been proposed.

For example, Japanese Patent Application Laid-Open Publication No. 2002-73303 describes a technique of generating a page description language to be divided by the page to be able to cope with parallel processing by a host device in order to perform the parallel processing by the page in a multiprocessor printer equipped with a plurality of processors.

Because the technique disclosed in Japanese Patent Application Laid-Open Publication No. 2002-73303, however, performs all of the pieces of processing from the analysis of PDL data and the expansion thereof to the transfer of the expanded PDL data to a printer engine in the manner of assigning one processor per page, delay at the time of the transfer of the PDL data to the printer engine easily arises.

The reduction of the aforesaid delay at the time of the transfer of the PDL data to the printer engine can be achieved by classifying a series of pieces of image processing of generating printing data on the basis of the PDL data into a task of performing language interpretation processing by the page and a task of performing rasterization processing by the band, and by assigning each of a plurality of operation sections to either one of the tasks.

If a fixed number of operation sections is, however, assigned to each of the task performed by the page and the task performed by the band, then some unused operation sections are led to exist in some numbers of pages to be printed. For example, if two operation sections are assigned to the task performed by the page and two operation sections are assigned to the task performed by the band, then one operation section becomes unused state when a printing request of one page is processed. In such a state, each operation section cannot be used efficiently, and the improvement of the processing speed of the whole image processing cannot be achieved.

SUMMARY OF THE INVENTION

It is an object of the present invention to improve a processing speed at the time of generating printing data from PDL data by using a plurality of operation sections.

To achieve at least one of the abovementioned objects, an image formation apparatus, reflecting one aspect of the present invention comprises:

a reception section to receive PDL data;

an image processing section including a plurality of operation sections, each of which executing a task performing processing by a page or a task performing processing by a band to generate printing data based on the PDL data;

a control section to analyze the PDL data to obtain the number of printing pages, the control section dynamically setting the number of the operation sections assigned to each of the task performing the processing by the page and the task performing the processing by the band in accordance with the obtained number of the printing pages; and a printing section to form an image on a printing medium based on the generated printing data.

Preferably, the image formation apparatus further comprises a storage section to previously store a value of a minimum number of the operation sections assigned to the task performing the processing by the band, wherein the control section calculates a maximum number of the operation sections assigned to the task performing the processing by the page by subtracting the minimum number of the operation sections assigned to the task performing the processing by the band, the minimum number being stored in the storage section, from a total number of the plurality of operation sections, and wherein the control section dynamically sets the number of the operation sections assigned to each of the tasks in order that the number of the operation sections assigned to the task performing the processing by the page is the same number as the number of the printing pages when the calculated maximum number is equal to the number of the printing pages or more; and in order that the number of the operation sections assigned to the task performing the processing by the page is equal to the maximum number or less, and that the number of pages to be processed by each of the operation sections assigned to the task performing the processing by the page is the least, and further that the number of the operation sections that are to generate an unprocessed state among the operation sections assigned to the task performing the processing by the page is the least, when the calculated maximum number is less than the number of the printing pages.

Preferably, the image formation apparatus further comprises an input section for a user to input the value of the minimum number of the operation sections assigned to the task performing the processing by the band, wherein the storage section sets the previously stored value based on the value input by the input section.

BRIEF DESCRIPTION OF THE DRAWINGS

The present invention will become more fully understood from the detailed description given hereinbelow and the appended drawings, and thus are not intended as a definition of the limits of the present invention, wherein;

FIG. 7A is a diagram showing the relations between the numbers of cores assigned to an LS task and a RAS task and processing times in the case where the number of printing pages≦the maximum number of cores assigned to the LS task is satisfied;

DETAILED DESCRIPTION OF THE PREFERRED EMBODIMENTS

In the following, examples of the embodiments of the present invention will be described in detail with reference to the accompanying drawings.

Figure 1:
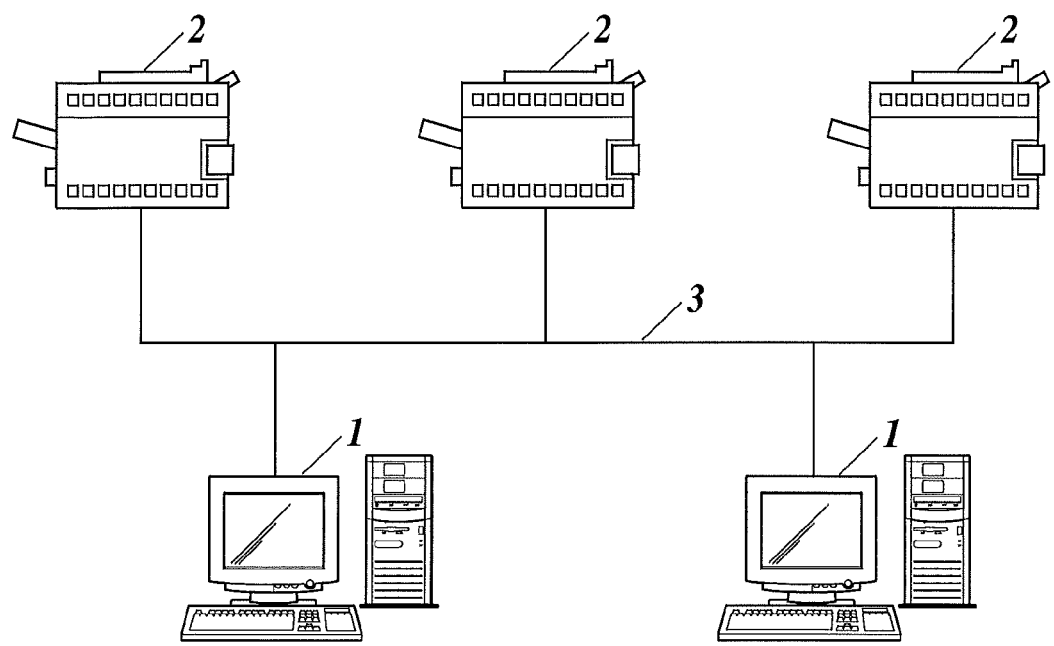
FIG. 1 is an explanatory view showing the network configuration of a first embodiment.

FIG. 1 is a network configuration view including image formation apparatuses 2 according to the present invention.

The image formation apparatuses 2, 2, 2 are communicably connected to computers 1, 1 through a line 3.

The line 3 constitutes a network composed of the image formation apparatuses 2, 2, 2 and the computers 1, 1. Any form of the line 3 can be used as long as the line 3 with the form can communicably connect the computers 1, 1 and the image formation apparatuses 2, 2, 2. For example, the line 3 may be any one of, or a combination of a plurality of, wired connection lines, such as a line in conformity with Ethernet (registered trademark), a coaxial cable, and an optical fiber, and wireless lines in conformity with various standards for realizing wireless communication. Furthermore, the network size of the line 3 may be any one of those of a local area network (LAN), the Internet, and the like.

Figure 2:
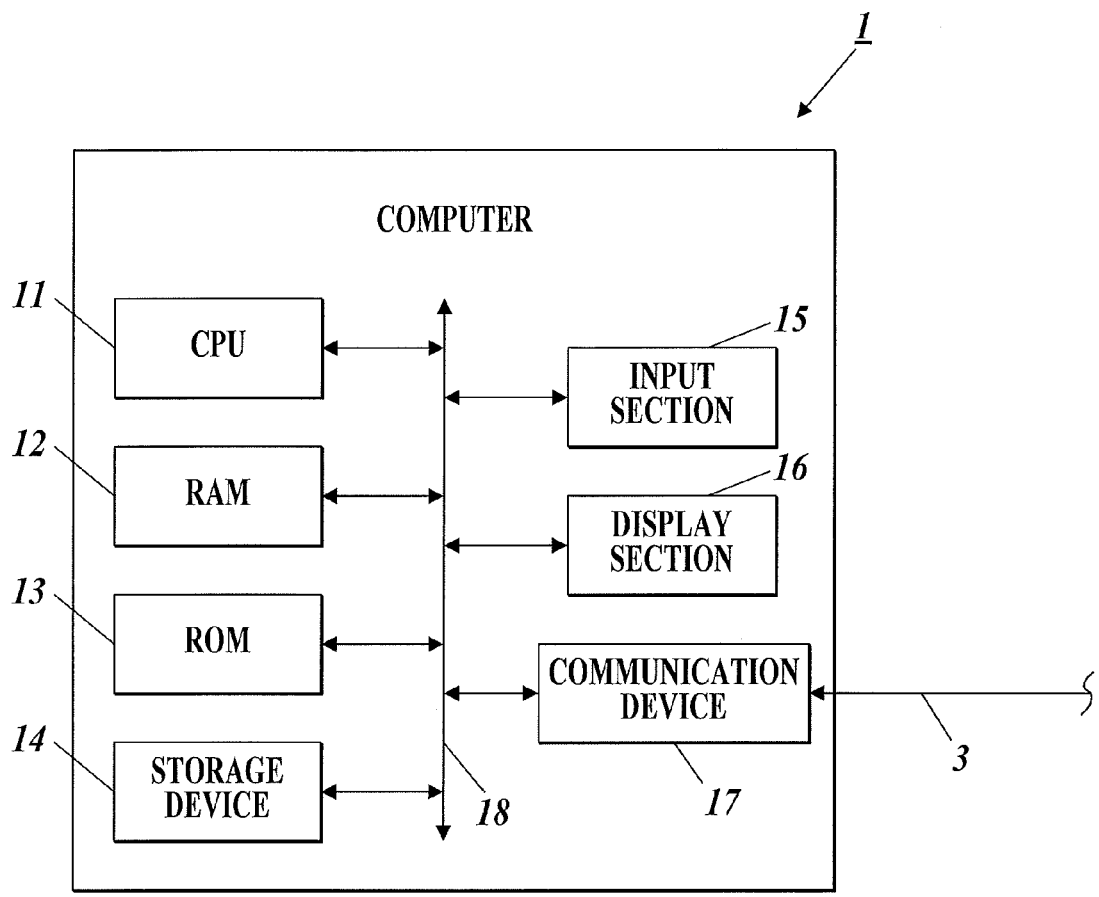
FIG. 2 is a block diagram showing the main configuration of a computer shown in FIG. 1.

FIG. 2 is a block diagram showing the main configuration of each of the computers 1. Because all of the computers 1 have the same configurations, shown in FIG. 1, one of the computers 1 will be described in the following.

The computer 1 is composed of a central processing unit (CPU) 11, a random access memory (RAM) 12, a read only memory (ROM) 13, a storage device 14, an input section 15, a display section 16, and a communication device 17, and each section is connected to each other through a bus 18.

The CPU 11 reads out a program, data, and the like according to processing content from the ROM 13 or the storage device 14 and processes the read-out program, the data, and the like to perform the various pieces of processing of the computer 1 and the operation control of each section of the computer 1. For example, the CPU 11 performs the processing of generating PDL data D1 on the basis of document data and the like stored in the storage device 14 and transmitting the generated PDL data D1 to one of the image formation apparatuses 2 through the communication device 17 in conformity with an instruction input from the input section 15.

The RAM 12 functions as a primary storage device to store the program, the data, and the like that are read out in the processing executed by the CPU 11, and to store the data, the parameters, and the like that are generated by processing.

The ROM 13 stores the programs, the data, and the like that are to be read out by the CPU 11 in a non-rewritable state.

The storage device 14 is, for example, a hard disk or a flash memory, and stores the programs, the document data of printing objects, and the like that are to be read out by the CPU 11 in a rewritable state.

The input section 15 is, for example, a keyboard and a mouse, and receives a user's operation input to output an operation signal to the CPU 11.

The display section 16 is a display unit or the like, such as a cathode ray tube (CRT) or a liquid crystal display, and displays a display screen based on a processing result of the CPU 11.

The communication device 17 connects the computer 1 to an external communication line (for example, the line 3), and performs the data transmission and reception with external equipment. The communication device 17 is, for example, a network interface card (NIC), and a device enabling the connection of the computer 1 according to the type of the communication line can be used.

Figure 3:
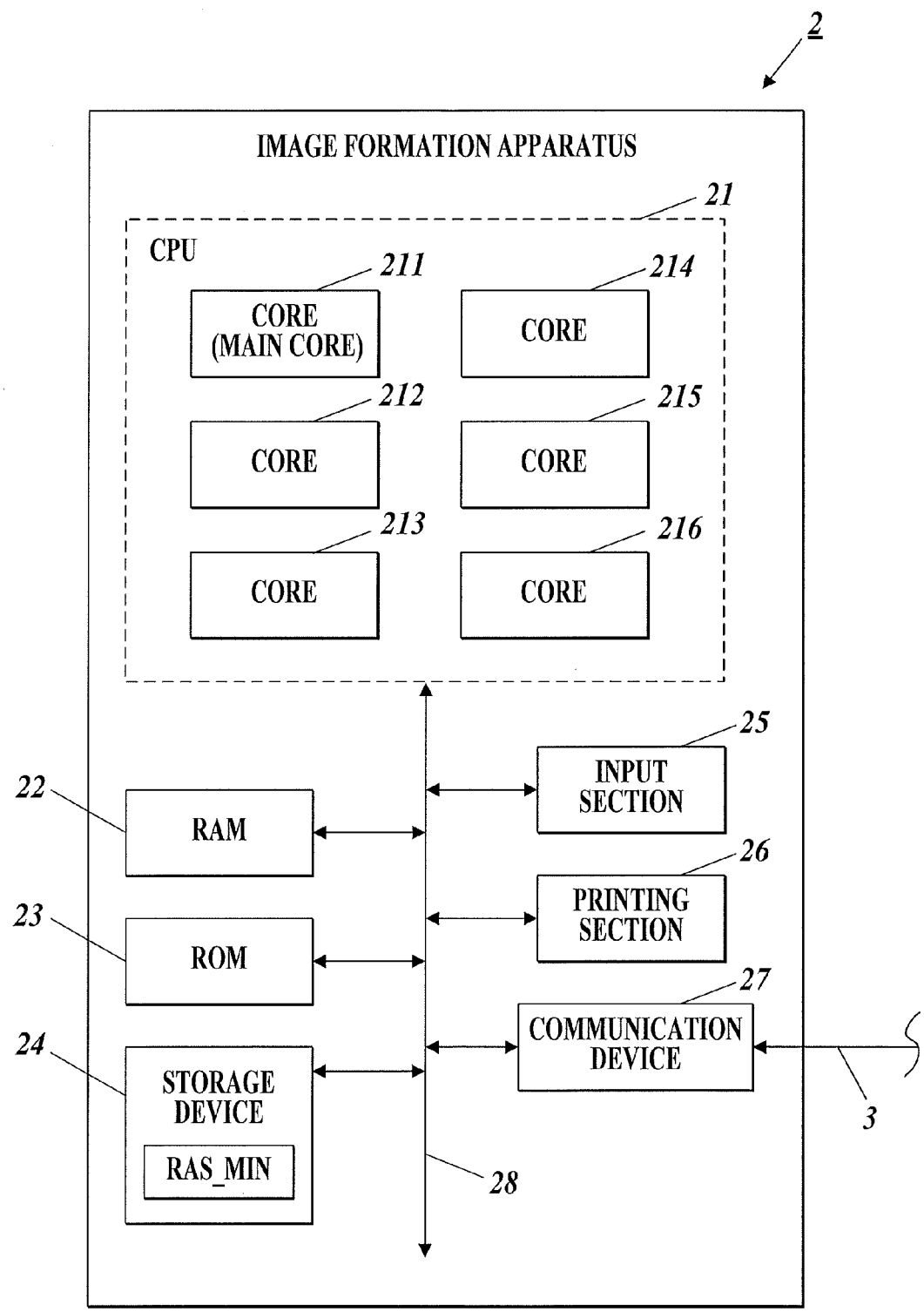
FIG. 3 is a block diagram showing the main configuration of an image formation apparatus shown in FIG. 1.

FIG. 3 is a block diagram showing the main configuration of each of the image formation apparatuses 2. Because all of the image formation apparatuses 2, 2, 2 have the same configurations, shown in FIG. 3, one image formation apparatus 2 will be described in the following.

The image formation apparatus 2 is composed of a CPU 21, a RAM 22, a ROM 23, a storage device 24, an input section 25, a printing section 26, and a communication device 27, and each section is connected to each other through a bus 28.

The CPU 21 is that of a multi-core configuration equipped with cores 211-216 as a plurality of operation sections. Although the present embodiment will be described on the supposition that the number of cores is six, the number of cores is not limited to six.

The core (main core) 211 reads out a program, data, and the like according to processing content from the ROM 23 or the storage device 24, and executes various pieces of processing in conformity with the read-out program. Thereby, the core 211 performs the operation control of each section of the image formation apparatus 2. For example, by executing the printing control processing, described below, in conjunction with the read-out program, the core 211 realizes the function as a control section.

Furthermore, by reading out a program and data that correspond to the processing content from the ROM 23 or the storage device 24 and executing an LS task T1 or a RAS task T2 in conformity with the control of the core 211, each of the cores 211-216 realizes the function as an image processing section.

The RAM 22 functions as a primary storage device to store the program, data, and the like that are read-out in processing executed by the CPU 21, and to store the data, the parameters, and the like that are generated by processing.

The ROM 23 stores the programs, the data, and the like that are to be read out by the CPU 21 in a non-rewritable state.

The storage device 24 is, for example, a hard disk or a flash memory, and stores the programs, the data, and the like that are to be read out by the CPU 21 in a rewritable state. In the present embodiment, the storage device 24 previously stores a minimum number of cores assigned to the RAS task (RAS_MIN, the details of which will be described below).

The input section 25 is, for example, an input panel having a touch panel display, and receives a user's operation input to output an operation signal to the CPU 21.

The printing section 26 is an engine for forming an image on a printing medium, such as a sheet of paper, on the basis of printing data D3, described below, by an electrophotographic printing system, an ink jet system, or the like.

The communication device 27 connects the image formation apparatus 2 to an external communication line (for example, the line 3), and performs data transmission and reception with external equipment. That is, the communication device 27 realizes the function as a reception section to receive the PDL data D1 from the computers 1. The communication device 27 is, for example, a network interface card (NIC), and a device enabling the connection according to the type of a communication line can be used as the communication device 27.

Next, image processing by each of the image formation apparatuses 2 will be described.

Figure 4:
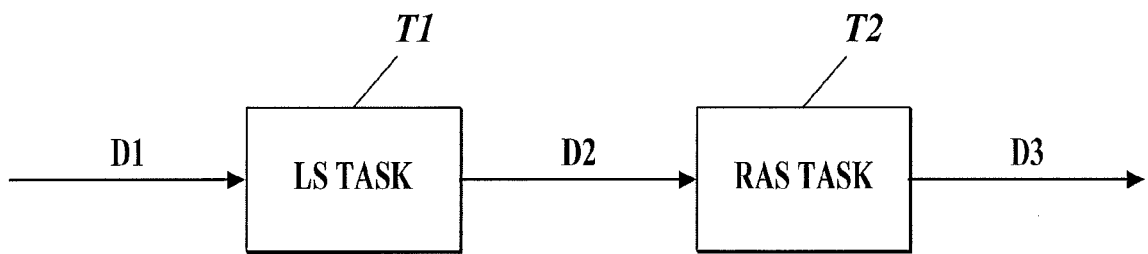
FIG. 4 is a functional block diagram showing the processes of image processing by the image formation apparatus.

FIG. 4 is a functional block diagram showing an example of the process and the function of image processing by the CPU 21.

As shown in FIG. 4, the PDL data D1 that has been transmitted from one of the computers 1 and has been received by the communication device 27 is input into the LS task T1, and is subjected to language analysis processing by the LS task T1. The LS task T1 is realized by the reading-out of the program, the data, and the like for the performance of the language analysis processing from the ROM 23 or the storage device 24 by the cores assigned to the LS task T1 among the cores 211-216 in the CPU 21, and by the execution of the read-out program, the data, and the like by the cores.

In the language analysis processing, the PDL data D1 is analyzed, and intermediate language data D2 (for example, a display list) is generated. The intermediate language data D2 is the data expressing the printing content for one page. The printing content for one page indicates, for example, the printing content for one page of a predetermined size (for example, A4) of a sheet of paper. That is, the language analysis processing by the LS task T1 is performed by the sheet of paper. The generated intermediate language data D2 is output to the RAS task T2.

In the RAS task T2, rasterization processing is performed on the basis of the intermediate language data D2. The RAS task T2 is realized by the reading-out of the program, the data, and the like for the performance of the rasterization processing from the ROM 23 or the storage device 24 by the cores assigned to the RAS task T2 among the cores 211-216 in the CPU 21, and by the execution of the read-out program, the data, and the like by the cores.

In the rasterization processing, the printing data D3 is generated on the basis of the intermediate language data D2.

To put it concretely, in the rasterization processing, the printing data D3 is generated by the execution of the rendering processing and the like of an object based on the intermediate language data D2 to a predetermined range of a rendering region. The printing data D3 is the bitmap data for printing or the compressed bitmap data generated by compressing the bitmap data that does not require any more working and processing to enable the printing section 26 to perform the printing output of the data.

The rasterization processing is performed by the band in the present embodiment. The printing content for one page is composed of a plurality of bands. Each of the bands is composed of a plurality of lines. Each of the lines is a set of pixels that constitute an image and are arranged in a predetermined direction (for example, the lateral direction of the image), and the image is configured by combining the lines by arranging the lines in a direction (for example, the longitudinal direction of the image) perpendicular to the predetermined direction. Each of the bands is a set of a plurality of lines, and the printing content for one page is a set of a plurality of bands.

The printing data D3 generated by the RAS task T2 is input to the printing section 26, and an image is printed and output onto a printing medium, such as a sheet of paper, on the basis of the printing data D3.

The plurality of cores 211-216 of the CPU 21 is assigned to either the LS task T1 or the RAS task T2 at the time of performing the aforesaid image processing. As described above, the LS task T1 is the processing performed by the page, and the RAS task T2 is the processing performed by the band. Consequently, for example, if four cores are assigned to the LS task T1, though the number of pages is one, the residual three cores are led to float in unprocessed states without executing any tasks. On the other hand, the processing of the RAS task T2 cannot be performed until the completion of the processing of the LS task T1, however, the RAS task T2 is performed by the band. Accordingly, if many cores can be assigned to the RAS task T2, the rasterization processing can be speeded up that much.

Figure 5A:
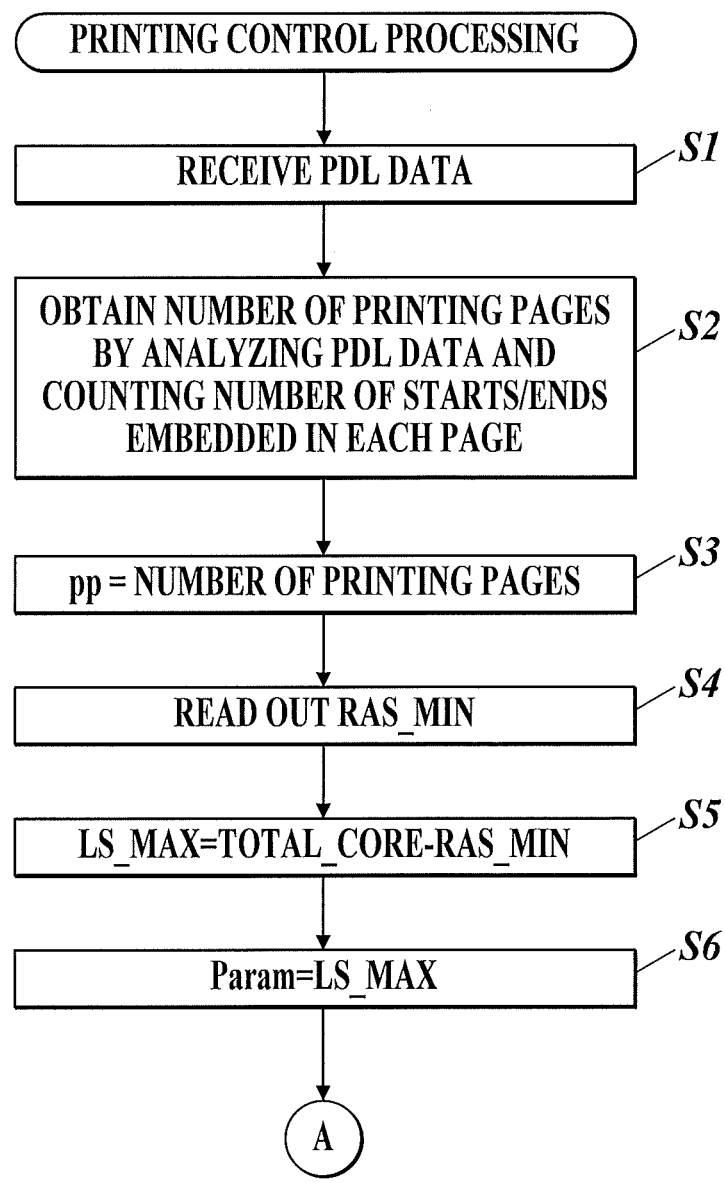
FIG. 5A is a flow chart showing printing control processing executed by a core (main core) of FIG. 3.
Figure 5B:
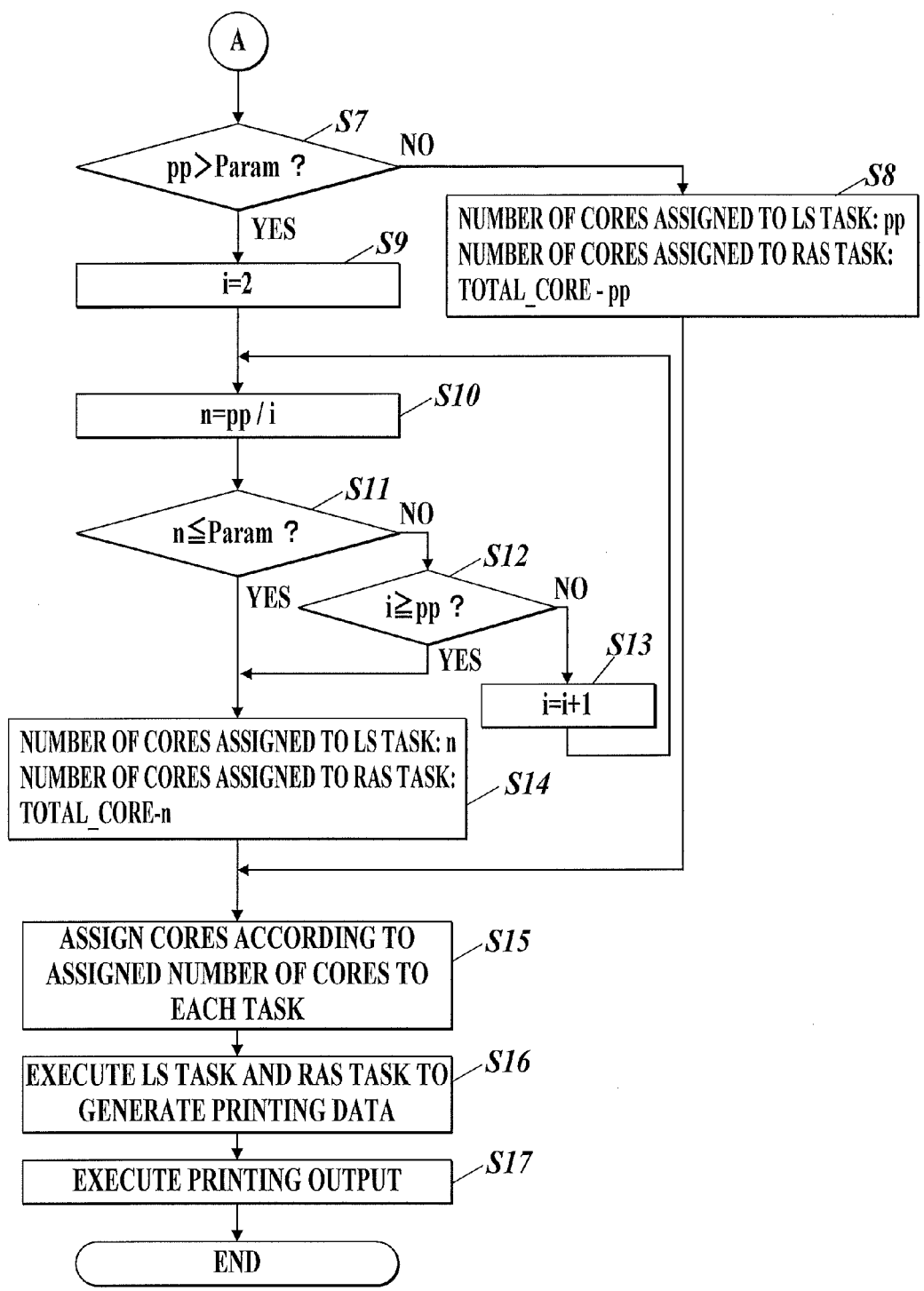
FIG. 5B is another flow chart showing the printing control processing executed by the core (main core) of FIG. 3.

In order to improve the processing speed until the output of printed matter, the image formation apparatus 2 of the present embodiment accordingly executes the printing control processing shown in FIGS. 5A and 5B to dynamically set the numbers of cores to be assigned to the LS task T1 and the RAS task T2 according to the number of printing pages included in the received PDL data D1.

In the printing control processing, the numbers of cores assigned to the LS task T1 and the RAS task T2 are set on the basis of the minimum number of cores to be assigned to the RAS task T2 (denoted as RAS_MIN), which minimum number has previously been set in the storage device 24. The RAS_MIN is the number of cores that should minimally be assigned to the RAS task T2 and be secured, and the RAS_MIN is one or more and the number of the total cores−1 or less.

A default value of the RAS_MIN has previously been set in the storage device 24 on the basis of the usage of a product before the factory shipment thereof, here. For example, if the product is a color machine, the processing of the RAS task T2 is heavier than that of a specialized monochrome machine, and takes a longer processing time. The RAS_MIN of the color machine is accordingly set to be higher than that of the monochrome machine generally. Furthermore, for example, the higher the resolution of the printing section 26 is, the heavier the processing of the RAS task T2 is. Accordingly, the RAS_MIN of a product having higher printing resolution is generally set to be higher than that of a product having lower printing resolution.

On the other hand, even in the same product, the preferable RAS_MIN sometimes varies correspondingly to printing objects. For example, if a user performs only monochrome printing even if he or she uses a color machine, he or she may be able to improve the processing speed by lowering the RAS_MIN from the default value thereof because the processing of the RAS task T2 is lighter than the supposed value at the time of the shipment of the product. Furthermore, for example, if a user frequently performs printing in a paper size larger than the standard A4 size, he or she may be able to improve the processing speed by raising the RAS_MIN from the default value thereof to raise the utilization ratio of the whole CPU 21 because the processing of the RAS task T2 is heavier than the standard weight.

The image formation apparatus 2 of the present embodiment is accordingly configured to enable a user to set the RAS_MIN with the input section 25.

Figure 6:
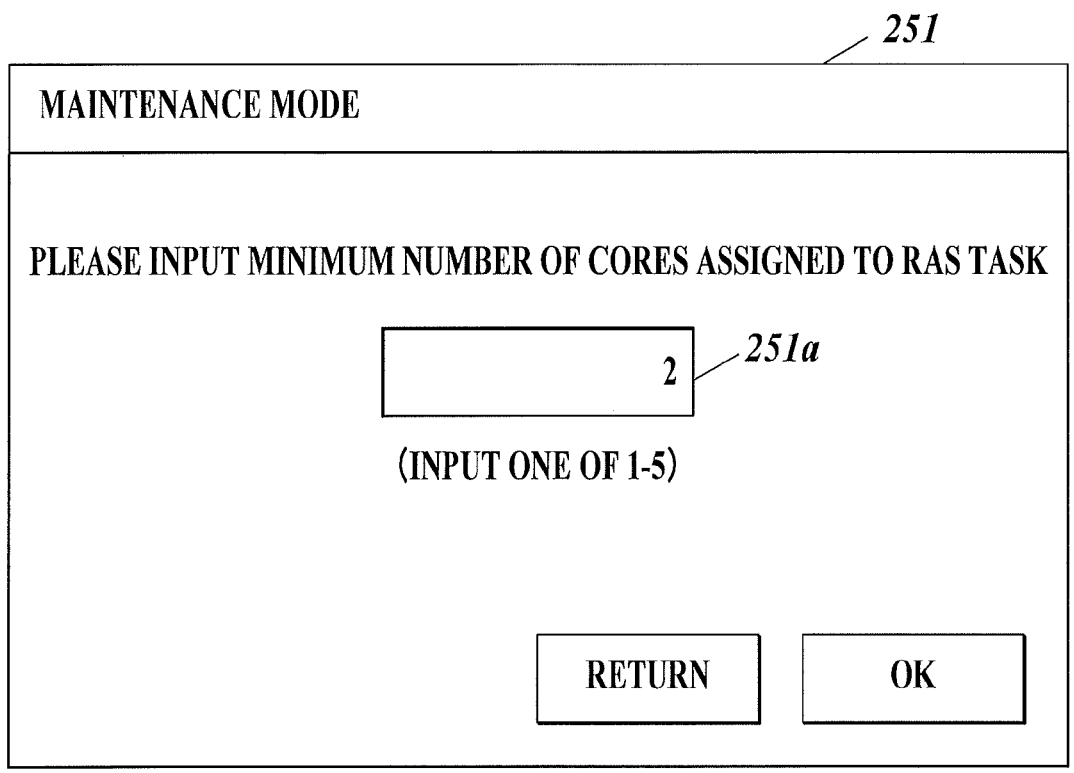
FIG. 6 is a view showing an example of a setting screen.

FIG. 6 is a view showing an example of a setting screen 251 displayed on the touch panel display of the input section 25 in a maintenance mode for a user's performance of the machine setting pertaining to the image formation apparatus 2. As shown in FIG. 6, the setting screen 251 is provided with an entry field 251a of the minimum number of cores assigned to the RAS task T2 (RAS_MIN). When a value of the RAS_MIN is input in the setting screen 251, the core 211 of the CPU 21 changes the value of the RAS_MIN in the storage device 24 to the input value.

Incidentally, the setting screen 251 is not limited to the aforesaid mode, but may be another mode as long as the mode can specify the value of the RAS_MIN. For example, the setting screen 251 may be configured to be a mode enabling a user to input a priority of rasterization processing by selecting the priority in a table or the like, which is stored in the storage device 24 in advance, in which table or the like the priorities of rasterization processing of language analysis processing are related to the values of the RAS_MIN.

By such a configuration, in which a user can arbitrarily set the RAS_MIN, the further improvement of processing speed can be achieved according to printing objects.

In the following, the printing control processing executed by the core 211 of the CPU 21 will be described with reference to FIGS. 5A and 5B. The printing control processing is executed by the cooperation of the core 211 and a program stored in the ROM 23 or the storage device 24.

First, the communication device 27 receives the PDL data D1 transmitted from one of the computers 1, and the received PDL data D1 is stored in the RAM 22 (Step S1). Next, the number of starts/ends embedded in each page of the PDL data D1 is counted, and thereby the number of printing pages is obtained (Step S2). Then, the number of printing pages is set in a variable pp (Step S3).

Next, the value of the RAS_MIN is read out of the storage device 24 (Step S4), and the RAS_MIN is subtracted from the number of the total cores (TOTAL_CORE, which is 6 here). Thereby, the maximum number of the cores assigned to the LS task (denoted as LS_MAX) is calculated (Step S5).

Next, a value of the LS_MAX is set in a switching parameter Param (Step S6), and it is judged whether the variable pp is larger than the switching parameter Param or not (Step S7). If it is judged that the variable pp is not larger than the switching parameter Param, that is, it is judged that the number of printing pages is equal to the LS_MAX or less (Step S7: NO), then the variable pp, that is, the number of the printing pages is set in the number of cores assigned to the LS task T1, and TOTAL_CORE−pp, that is, the residual number of cores is set in the number of cores assigned to the RAS task T2 (Step S8).

On the other hand, if it is judged that the variable pp is larger than the switching parameter Param, that is, it is judged that the number of printing pages is larger than the LS_MAX (Step S7: YES), then an initial value 2 is set in a counter i (Step S9), and a value n=pp/i is calculated (Step S10). Then it is judged whether the calculation result indicates n≦Param or not (Step S11).

If it is judged that the value n does not satisfy n≦Param (Step S11: NO), then it is judged whether i≧pp or not (Step S12). If it is judged that the counter i does not satisfy i≧pp (Step S12: NO), the counter i is incremented by one (Step S13), then the processing returns to that at Step S10.

If it is judged that n≦Param (Step S11: YES), or it is judged that i≧pp (Step S12: YES), then the value n is set in the number of cores assigned to the LS task T1, and a value TOTAL_CORE−n is set in the number of cores assigned to the RAS task T2 (Step S14).

If the number of cores assigned to each of the LS task T1 and the RAS task T2 has been set, then the number of cores set to each of the LS task T1 and the RAS task T2 is assigned (Step S15), and the LS task T1 and the RAS task T2 are executed on the basis of the PDL data D1 (Step S16). Then, the printing section 26 forms an image on a printing medium on the basis of the printing data D3 generated through the LS task T1 and the RAS task T2 (Step S17), and the printing control processing is ended.

FIG. 7A is a diagram showing the relations between the numbers of cores assigned to the LS task T1 and the RAS task T2 and processing times in the case of pp≦Param. The case where the total number of the cores is six, the RAS_MIN is two, the LS_MAX is four, the number of printing pages is three, and one page is composed of three dots by four lines is shown as an example here. Furthermore, half-tone dot meshing A indicates a processing time required for the LS task T1, half-tone dot meshing B is a processing time required for the RAS task T2, and no half-tone dot meshing C indicates an overhead time. Because the RAS task T2 is processed by the band, the overhead for the processing of the preliminary preparation thereof and the like arises.

As shown in the upper row in FIG. 7A, if LS_MAX=4 is assigned to the LS task T1, and if RAS_MIN=2 is assigned to the RAS task T2, then one of the cores assigned to the LS task T1 becomes an unused state, and the utilization ratio of the whole CPU 21 is bad. The processing time takes 12 unit times.

Accordingly, if the number of cores for the number of printing pages, that is, three, is assigned to the LS task T1, and if the residual three is assigned to the RAS task T2 by the processing at Step S8 of FIG. 5B, then no unused cores appear as shown in the lower row of FIG. 7A, that is, the utilization ratio as the whole CPU 21 is improved, and the processing time is shortened to 9 units.

Figure 7B:
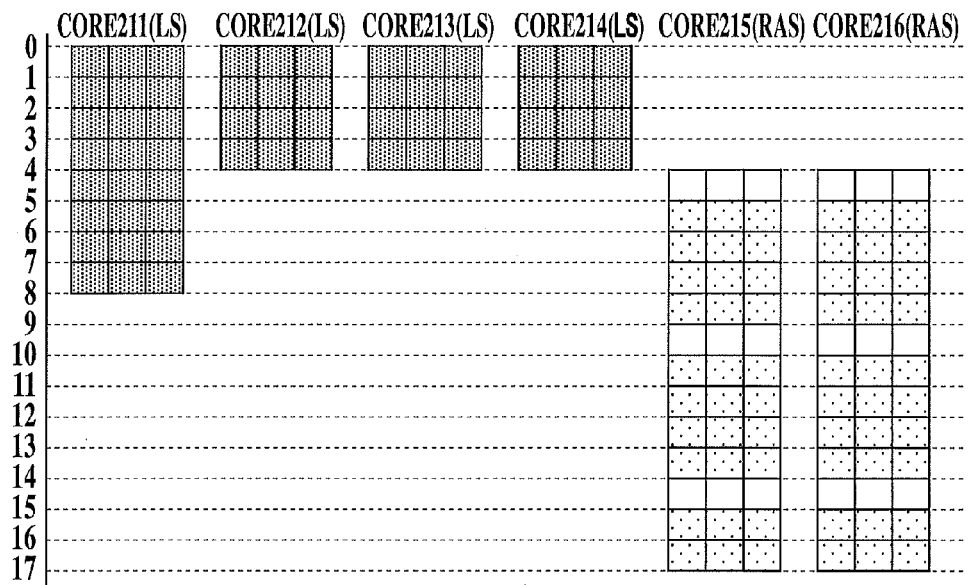
FIG. 7B is a diagram showing the relations between the numbers of cores assigned to the LS task and the RAS task and processing times in the case where the number of printing pages>the maximum number of cores assigned to the LS task is satisfied.
Figure 7B:
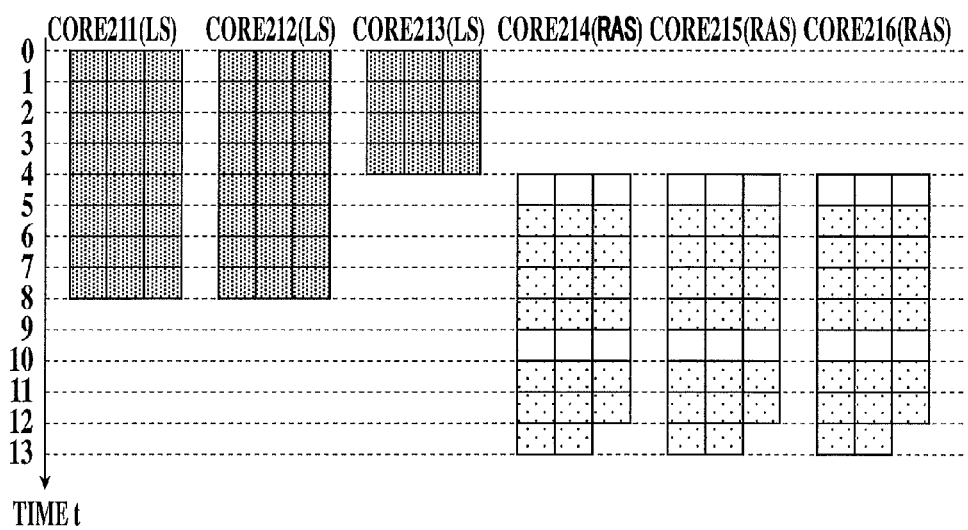

FIG. 7B is a diagram showing the relations between the numbers of cores assigned to the LS task T1 and the RAS task T2 and processing times in the case of pp>Param. The case where the total number of the cores is six, the RAS_MIN is two, the LS_MAX is four, the number of printing pages is five, and one page is composed of three dots by four lines is shown as an example here. Furthermore, the half-tone dot meshing A indicates a time required for the LS task T1, the half-tone dot meshing B is a time required for the RAS task T2, and the no half-tone dot meshing C indicates an overhead time.

As shown in the upper row in FIG. 7B, if LS_MAX=4 is assigned to the LS task T1, and if RAS_MIN=2 is assigned to the RAS task T2, then the LS task T1 is simultaneously performed in four cores. Then, while any one of the cores is performing the LS task T1 of the residual one page, the other three cores assigned to the LS task T1 are being in their unused states, and the utilization ratio of the whole CPU 21 is bad. The processing time takes 17 unit times.

Accordingly, if the number of cores assigned to each of the LS task T1 and the RAS task T2 is calculated by the processing at Steps S12-S14 in FIG. 5B in order that the number of cores assigned to the LS task T1 may be the LS_MAX or less, and that the number of pages of the five printing pages to be processed in each core assigned to the LS task T1 may be the minimum, and that the number of cores becoming unprocessed sate of the cores assigned to the LS task T1 may become the minimum, and if three cores, which are the calculation result, are assigned to the LS task T1, and further if the residual three cores are assigned to the RAS task T2, then, as shown in the lower row of FIG. 7B, the number of the cores being in unused states is reduced to one, and the utilization ratio as the whole CPU 21 is improved, and the processing time is shortened to 13 units.

As described above, because the image formation apparatus 2 sets the number of cores assigned to each of the LS task T1 and the RAS task T2 in order that the utilization ratio of the whole CPU 21 may become highest with the minimum number of cores to be assigned to the RAS task T2 secured according to the number of printing pages, the processing speed at the time of generating the printing data D3 from the PDL data D1 can be improved.

Second Embodiment

Next, a second embodiment of the present invention will be described.

Although the case where the CPU 21 of the image formation apparatus 2 takes a multi-core configuration and the processing of generating the printing data D3 from the PDL data D1 is performed in the image formation apparatus 2 has been exemplified to be described in the first embodiment, the case where the CPU 41 of a computer 4 takes a multi-core configuration and the printing data D3 is generated in the computer 4 will be exemplified to be described in the present embodiment.

Figure 8:
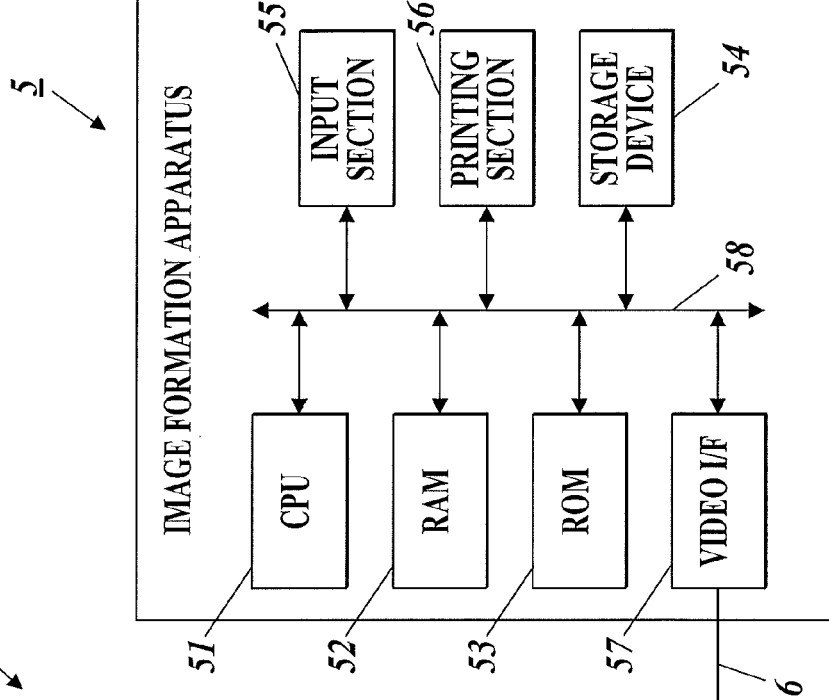
FIG. 8 is a diagram showing the whole configuration of a second embodiment.
Figure 8:
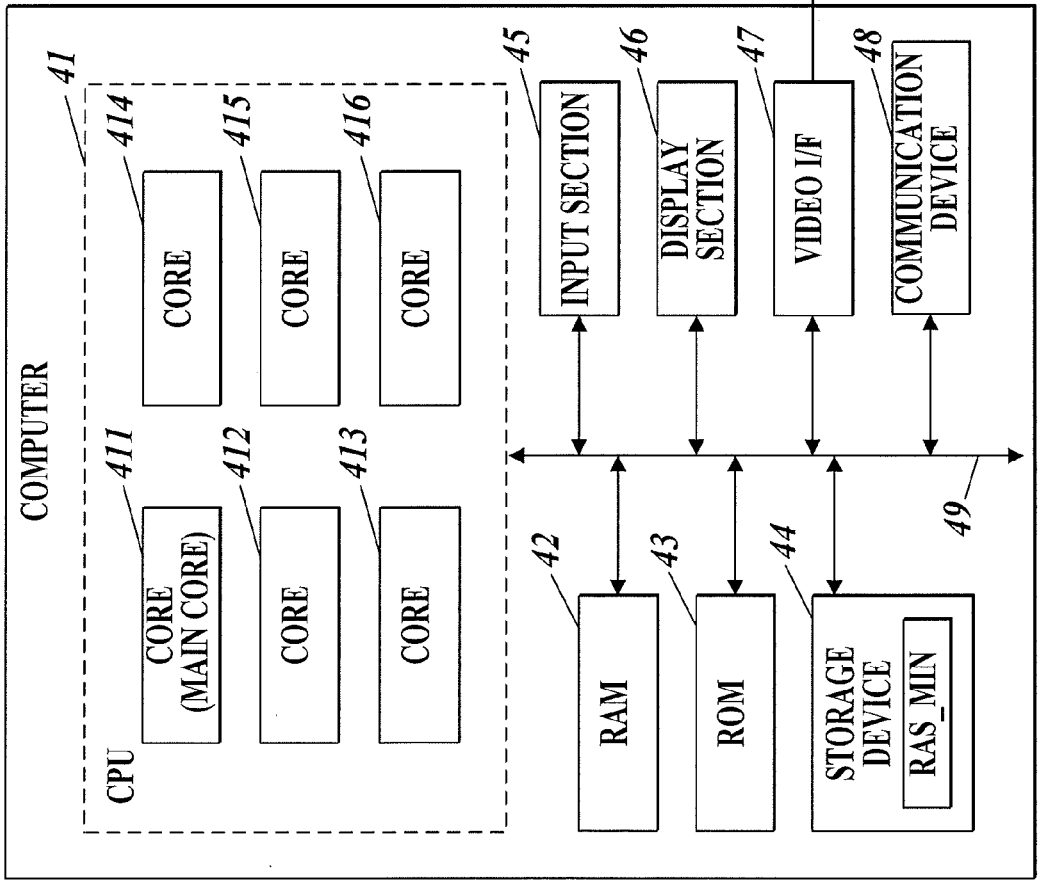

FIG. 8 is a diagram showing the whole configuration of the second embodiment. As shown in FIG. 8, the computer 4 is connected to an image formation apparatus 5 through a video-specialized line 6 in the second embodiment.

As shown in FIG. 8, the computer 4 is composed of the CPU 41, a RAM 42, a ROM 43, a storage device 44, an input section 45, a display section 46, a video interface (I/F) 47, and a communication device 48, and each section is connected to each other through a bus 49.

The CPU 41 is that of a multi-core configuration including cores 411-416 as a plurality of operation sections. Although the number of cores of the CPU 41 is set to six in the present embodiment, the number of cores is not particularly limited.

The core (main core) 411 reads out a program, data, and the like according to processing content from the ROM 43 or the storage device 44, and executes various pieces of processing in conformity with the read-out program. Thereby, the core 411 performs the operation control of each section of the computer 4. For example, by executing the printing data generation processing, described below, in conjunction with the read-out program, the core 411 realizes the function as a control section.

Furthermore, by reading out a program, data, and the like that correspond to the processing content from the ROM 43 or the storage device 44 and executing the LS task T1 or the RAS task T2 in conformity with the control of the core 411, the cores 411-416 realize the functions as image processing sections.

The minimum number of cores assigned to the RAS task (RAS_MIN) is previously set in the storage device 44. Furthermore, the storage device 44 stores data D0, such as document data of a printing object.

The video I/F 47 is an interface for transmitting the printing data D3 to the image formation apparatus 5 through the video-specialized line 6.

Because the configurations of the ROM 43, the storage device 44, the input section 45, the display section 46, and the communication device 48 are similar to those of the aforesaid ROM 13, the storage device 14, the input section 15, the display section 16, and the communication device 17, respectively, the descriptions of those of the embodiment 1 are quoted to those of the embodiment 2.

Furthermore, the computer 4 is configured in order that a user can set the RAS_MIN with the input section 45. That is, a setting screen similar to the setting screen 251 shown in FIG. 6 is displayed in the display section 46 in conformity with an instruction from the input section 45, and the user can set the RAS_MIN in the setting screen. When a value of the RAS_MIN is input, the main core 411 of the CPU 41 changes the value of the RAS_MIN in the RAM 42 to the input value.

In addition, the aforesaid setting screen is not limited to the mode mentioned above, but may be any one as long as the mode enables a user to specify the value of the RAS_MIN. For example, the setting screen may be configured to be a mode enabling a user to input a priority of rasterization processing by selecting the priority in a table or the like, which is stored in the storage device 44 in advance, in which table or the like the priorities of pieces of rasterization processing to language analysis processing are related to the values of the RAS_MIN.

By such a configuration, in which a user can arbitrarily set the RAS_MIN, the further improvement of processing speed can be achieved according to printing objects.

Furthermore, as shown in FIG. 8, the image formation apparatus 5 is composed of a CPU 51, a RAM 52, a ROM 53, a storage device 54, an input section 55, a printing section 56, and a video I/F 57, and each section is connected to each other through a bus 58.

The CPU 51 is one equipped with a single operation section.

The video I/F 57 is an interface for inputting the printing data D3 from the computer 4.

The CPU 51 outputs the printing data D3 input from the computer 4 through the video I/F 57 to the printing section 56 in conformity with a program stored in the ROM 53, and makes the printing section 56 form an image on a printing medium on the basis of the printing data D3.

The configurations of the RAM 52, the ROM 53, the storage device 54, the input section 55, and the printing section 56 are similar to those of the aforesaid RAM 22, the ROM 23, the storage device 24, the input section 25, and the printing section 26, respectively, and accordingly the descriptions of those of the embodiment 1 are quoted to those of the embodiment 2.

As the operation of the second embodiment, the processes of the image processing described with reference to FIG. 4 in the first embodiment is executed by the CPU 41 of the computer 4.

To put it concretely, when the data D0 of a printing object, such as document data, is designated among the data stored in the storage device 44 through the input section 45, or is input through the communication device 48, and is stored in the RAM 42, then printing data generation processing is executed in cooperation with the core 411 and a program stored in the ROM 43 or the storage device 44. In the printing data generation processing, the PDL data D1 is generated from the data D0, and then the same processing as that at Steps S2-S16 of the printing control processing shown in FIGS. 5A and 5B is executed. Thereby, printing data is generated. The generated printing data D3 is transmitted to the image formation apparatus 5 by the video I/F 47.

As described above, because also the computer 4, similarly to the image formation apparatus 2, sets the number of cores assigned to each of the LS task T1 and the RAS task T2 in order that the utilization ratio of the whole CPU 41 may become highest with the minimum number of cores to be assigned to the RAS task T2 secured according to the number of printing pages, the processing speed at the time of generating the printing data D3 from the PDL data D1 can be improved.

As describe above, in the image formation apparatus 2, when the core 211 receives PDL data through the communication device 27, the core analyzes the PDL data to obtain the number of printing pages, and the core 211 dynamically sets the number of cores assigned to each of the LS task T1 performing the processing by the page and the RAS task T2 performing processing by the band according to the obtained number of printing pages.

Consequently, because the number of cores assigned to each of the LS task T1 and the RAS task T2 is set according to the number of printing pages, the processing speed at the time of generating the printing data D3 from the PDL data D1 can be improved in comparison with that in the case of fixing the number of cores assigned to each task.

Furthermore, the storage device 24 stores the value of the minimum number of the cores to be assigned to the RAS task T2 beforehand, and the core 211 calculates the maximum number of the cores assigned to the LS task by subtracting the minimum number of the cores assigned to the RAS task, which minimum number is stored in the storage device 24, from the total number of the cores. If the calculated maximum number of the cores is equal to the number of printing pages or more, the core 211 dynamically sets the number of the cores assigned to each of the LS task and the RAS task in order that the number of the cores assigned to the LS task may be the same number as the number of printing pages. If the calculated maximum number of cores is less than the number of printing pages, the core 211 dynamically sets the number of the cores assigned to each of the LS task and the RAS task in order that the number of the cores assigned to the LS task may be equal to the maximum number of the cores assigned to the LS task or less, and that the number of pages to be processed by each core assigned to the LS task T1 may become the smallest, and further that the number of the cores becoming unprocessed states may be the smallest among the cores assigned to the task performing processing by the page.

Consequently, it becomes possible to assign the optimum number of cores for the best utilization ratio as the whole CPU 21 to each of the LS task T1 and the RAS task T2 within a range in which the number of the cores to be minimally assigned to the RAS task T2 can be secured.

Furthermore, because the value of the minimum number of cores to be assigned to the RAS task can be input by a user with the input section 25, it becomes possible to assign the further optimum number of the cores to each of the LS task T1 and the RAS task T2 according to the use mode of the image formation apparatus 2 by the user.

Also the computer 4 has the functions similar to those of the image formation apparatus 2, and can achieve similar effects.

In addition, the aforesaid descriptions of the first and the second embodiments show suitable examples of the image formation apparatus 2 and the computer 4 according to present invention, and the present invention is not limited to the contents of the descriptions.

For example, although the first and the second embodiments have been described on the supposition that the cores 211 and 411 function as control sections in cooperation with the programs stored in the ROMs 23 and 43, respectively, or the like, the function as the control section may be performed by another core in each embodiment.

Furthermore, although the first and the second embodiments have been described on the supposition that each of the CPUs 21 and 41 are formed in the multi-core configuration equipped with a plurality of cores, each of the CPUs 21 and 41 may be configured in a multi-CPU configuration equipped with a plurality of CPUs.

Furthermore, although the first and the second embodiments have been described on the supposition that the functions as the control sections are realized by the main cores 211 and 411 in the CPUs 21 and 41, respectively, the functions as the control sections may be realized by separately providing CPUs.

Furthermore, although the first and the second embodiments have been described on the supposition that all of the cores 211-216 and 411-416 in the CPUs 21 and 41, respectively, are subjected to the assignment to the LS task T1 or the RAS task T2 to configure image processing sections, a part of the cores 211-216 and 411-416 in the CPUs 21 and 41, respectively, may be subjected to the assignation of another processing, and each the image processing sections may be composed of the residual plurality of cores.

Furthermore, although the examples using ROMs, non-volatile memories, hard disks, or the like as the computer-readable media for storing the programs pertaining to the present invention have been disclosed in the above description, the present invention is not limited to these examples. Portable record media, such as a compact disk read only memory (CD-ROM), can be applied as the computer-readable media. Furthermore, a carrier wave can also be applied as a medium for providing the data of a program pertaining to the present invention through a communication line.

In addition, also the detailed configuration and the detailed operation of each device can suitably be changed without departing from the spirit and the scope of the present invention.

What is claimed is:

1. An image formation apparatus, comprising:
a reception section to receive PDL data;
an image processing section including a plurality of operation sections, each of which executing a task performing processing by a page or a task performing processing by a band to generate printing data based on the PDL data;
a control section to analyze the PDL data to obtain a number of printing pages, the control section dynamically setting a number of the operation sections assigned to each of the task performing the processing by the page and the task performing the processing by the band in accordance with the obtained number of the printing pages;
a storage section to previously store a value of a minimum number of the operation sections assigned to the task performing the processing by the band, wherein
the control section calculates a maximum number of the operation sections assigned to the task performing the processing by the page by subtracting the minimum number of the operation sections assigned to the task performing the processing by the band, the minimum number being stored in the storage section, from a total number of the plurality of operation sections, and wherein
the control section dynamically sets the number of the operation sections assigned to each of the tasks in order that the number of the operation sections assigned to the task performing the processing by the page is the same number as the number of the printing pages when the calculated maximum number is equal to the number of the printing pages or more; and in order that the number of the operation sections assigned to the task performing the processing by the page is equal to the maximum number or less, and that the number of pages to be processed by each of the operation sections assigned to the task performing the processing by the page is the least, and further that the number of the operation sections that are to generate an unprocessed state among the operation sections assigned to the task performing the processing by the page is the least, when the calculated maximum number is less than the number of the printing pages; and a printing section to form an image on a printing medium based on the generated printing data.

2. The image formation apparatus as claimed in claim 1, further comprising an input section for a user to input the value of the minimum number of the operation sections assigned to the task performing the processing by the band, wherein the storage section sets the previously stored value based on the value input by the input section.

3. A printing data generation apparatus, comprising:

a storage section to store PDL data;

an image processing section including a plurality of operation sections, each of which executing a task performing processing by a page or a task performing processing by a band to generate printing data based on the PDL data; and a control section to analyze the PDL data to obtain a number of printing pages, the control section dynamically setting a number of the operation sections assigned to each of the task performing the processing by the page and the task performing the processing by the band in accordance with the obtained number of the printing pages;

a storage section to previously store a value of a minimum number of the operation sections assigned to the task performing the processing by the band, wherein the control section calculates a maximum number of the operation sections assigned to the task performing the processing by the page by subtracting the minimum number of the operation sections assigned to the task performing the processing by the band, the minimum number being stored in the storage section, from a total number of the plurality of operation sections, and wherein the control section dynamically sets the number of the operation sections assigned to each of the tasks in order that the number of the operation sections assigned to the task performing the processing by the page is the same number as the number of the printing pages when the calculated maximum number is equal to the number of the printing pages or more; and in order that the number of the operation sections assigned to the task performing the processing by the page is equal to the maximum number or less, and that the number of pages to be processed by each of the operation sections assigned to the task performing the processing by the page is the least, and further that the number of the operation sections that are to generate an unprocessed state among the operation sections assigned to the task performing the processing by the page is the least, when the calculated maximum number is less than the number of the printing pages.

4. The printing data generation apparatus as claimed in claim 3, further comprising an input section for a user to input the value of the minimum number of the operation sections assigned to the task performing the processing by the band, wherein the storage section sets the previously stored value based on the value input by the input section.

5. A non-transitory computer-readable recording medium storing a program to make a computer, including a plurality of operation sections, function as:

an image processing section to generate printing data based on PDL data, through an execution of a task performing processing by a page or a task performing processing by a band by each of the plurality of operation sections; and a control section to analyze the PDL data to obtain a number of printing pages, the control section dynamically setting a number of the operation sections assigned to each of the task performing the processing by the page and the task performing the processing by the band in accordance with the obtained number of the printing pages;

a storage section to previously store a value of a minimum number of the operation sections assigned to the task performing the processing by the band, wherein the control section calculates a maximum number of the operation sections assigned to the task performing the processing by the page by subtracting the minimum number of the operation sections assigned to the task performing the processing by the band, the minimum number being stored in the storage section, from a total number of the plurality of operation sections, and wherein the control section dynamically sets the number of the operation sections assigned to each of the tasks in order that the number of the operation sections assigned to the task performing the processing by the page is the same number as the number of the printing pages when the calculated maximum number is equal to the number of the printing pages or more; and in order that the number of the operation sections assigned to the task performing the processing by the page is equal to the maximum number or less, and that the number of pages to be processed by each of the operation sections assigned to the task performing the processing by the page is the least, and further that the number of the operation sections that are to generate an unprocessed state among the operation sections assigned to the task performing the processing by the page is the least, when the calculated maximum number is less than the number of the printing pages.

6. The non-transitory computer-readable recording medium storing the program, as claimed in claim 5, further to make the computer function as an input section for a user to input the value of the minimum number of the operation sections assigned to the task performing the processing by the band, wherein the storage section sets the previously stored value based on the value input by the input section.

7. A printing data generation method to generate printing data based on PDL data through an execution of a task performing processing by a page or a task performing processing by a band by each of a plurality of operation sections, comprising:

analyzing the PDL data to obtain a number of printing pages, and dynamically setting a number of the operation sections assigned to each of the task performing the processing by the page and the task performing the processing by the band in accordance with the obtained number of the printing pages by a control section;

storing a value of a minimum number of the operation sections assigned to the task performing the processing by the band in a storage section, wherein calculating a maximum number of the operation sections assigned to the task performing the processing by the page by subtracting the minimum number of the operation sections assigned to the task performing the processing by the band, the minimum number being stored in the storage section, from a total number of the plurality of operation sections, and wherein dynamically setting the number of the operation sections assigned to each of the tasks in order that the number of the operation sections assigned to the task performing the processing by the page is the same number as the number of the printing pages when the calculated maximum number is equal to the number of the printing pages or more; and in order that the number of the operation sections assigned to the task performing the processing by the page is equal to the maximum number or less, and that the number of pages to be processed by each of the operation sections assigned to the task performing the processing by the page is the least, and further that the number of the operation sections that are to generate an unprocessed state among the operation sections assigned to the task performing the processing by the page is the least, when the calculated maximum number is less than the number of the printing pages by the control section.

* * * * *